United States Patent [19]
Herring

[11] Patent Number: 5,634,685
[45] Date of Patent: Jun. 3, 1997

[54] INFLATABLE/DEFLATABLE MOTORCYCLE SEAT CUSHION

[76] Inventor: Charles Herring, 1677 Dorothy, Ypsilanti, Mich. 48198

[21] Appl. No.: 405,751

[22] Filed: Mar. 20, 1995

[51] Int. Cl.$^6$ .................................................. A47C 31/00
[52] U.S. Cl. ................... 297/219.11; 297/217.3; 297/284.1; 297/452.41; 297/DIG. 3
[58] Field of Search ........................ 297/199, 200, 297/217.3, 284.1, 284.3, 284.6, 452.41, DIG. 3, 219.11, 228.12, 228.13; 5/449, 453, 454, 654

[56] References Cited

U.S. PATENT DOCUMENTS

| | | | |
|---|---|---|---|
| 1,288,445 | 12/1918 | Seibel | 297/199 |
| 1,678,972 | 7/1928 | Bronberger | 297/199 X |
| 3,558,187 | 1/1971 | Morse | 297/199 |
| 3,758,153 | 9/1973 | Bonikowsky | 297/199 |
| 3,836,196 | 9/1974 | Hu | 297/219.11 |
| 3,867,732 | 2/1975 | Morreli | 5/349 |
| 3,940,166 | 2/1976 | Smithea | 297/284.1 X |
| 3,997,214 | 12/1976 | Jacobs | 297/214 |
| 4,319,781 | 3/1982 | Tsuge | 297/214 |
| 4,427,214 | 1/1984 | Haggkvist | 280/752 |
| 4,459,714 | 7/1984 | Lin | 297/DIG. 3 |
| 4,504,089 | 3/1985 | Calvert et al. | 297/214 |
| 4,786,104 | 11/1988 | Fellenbaum | 297/224 |
| 4,799,276 | 1/1989 | Kadish | 5/446 |
| 4,952,439 | 8/1990 | Hanson | 428/72 |
| 5,005,904 | 4/1991 | Clemens | 297/284 |
| 5,022,385 | 6/1991 | Harza | 128/33 |
| 5,046,205 | 9/1991 | Garcia | 6/654 |
| 5,143,390 | 9/1992 | Goldsmith | 280/201 |
| 5,152,579 | 10/1992 | Bishai | 297/284.6 |
| 5,280,993 | 1/1994 | Hsh | 297/199 |
| 5,318,344 | 6/1994 | Wang | 297/199 |

FOREIGN PATENT DOCUMENTS

| | | | |
|---|---|---|---|
| 136244 | 1/1934 | Australia | 297/219.11 |
| 1146460 | 5/1983 | Canada . | |
| 342155 | 7/1936 | Italy | 297/199 |
| 16004 | of 1893 | United Kingdom | 297/199 |
| 14628 | of 1894 | United Kingdom | 297/199 |
| 20032 | of 1897 | United Kingdom | 297/199 |

*Primary Examiner*—Milton Nelson, Jr.
*Attorney, Agent, or Firm*—Gifford, Krass, Groh, Sprinkle, Patmore, Anderson & Citkowski

[57] ABSTRACT

An inflatable/deflatable cushion system adapted for installation onto a motorcycle seat may be operated either manually or electrically operated. In the latter case, an electrically operated air compressor is supported on the motorcycle and connected in a pneumatic path to an air port on the cushion. An electrical switch in electrical communication with a source of electrical power on the vehicle includes a first position activating the air compressor, causing the cushion to inflate, and a second position causing the cushion to deflate. In the preferred embodiment the cushion is generally U-shaped and attached to the motorcycle seat such that the rounded section of the U is most rearward on the seat with the ends of the U pointing forwardly.

10 Claims, 4 Drawing Sheets

SEE FIGS 2,3

INFLATABLE/DEFLATABLE MOTORCYCLE SEAT CUSHION

FIELD OF THE INVENTION

The present invention relates generally to inflatable cushioning, and more particularly, to an inflatable/deflatable cushion adapted for attachment to a motorcycle seat.

BACKGROUND OF THE INVENTION

Motorcycle comfort has improved dramatically in recent years, and now many features are available which help keep operators comfortable even during long-distance rides. The conversion from chain drive to positive, driveshaft power transfer assisted dramatically in this regard, and such a drive train in combination with modern advanced suspension systems results in a smooth, improved ride during prolonged trips.

The smoothest ride is typically possible on the open road, since interstate highways are typically in good repair and sustained, higher speed operation generally results in the least amount of disturbance and vibration. However, particularly in those situations where roads are less maintained or where frequent stops may be required, the need exists for comfort features beyond the most advanced drive train and suspension systems.

Typically, longer trips are made on touring bikes which not only incorporate these more advanced drive systems, but also feature greater weight and power and other aspects which make these longer trips more pleasant. For example, the typical large touring bike often uses a larger "king/queen" type of seat as opposed to the smaller saddles of lighter weight or higher performance type street bikes. Although these larger seats are substantially padded and include other internal features to absorb shock, there are times when even more cushioning is desirable. As this additional cushioning may need to be added after delivery from the factory, there remains a need not only for additional cushioning in some circumstances, but also as part of a device intended for an after-market type of product. More particularly, there remains a need for a motorcycle seat which may be inflated and deflated on an as-needed basis.

The prior art includes add-on inflatable cushions for bicycle seats, but none are appropriate for motorcycle use. For example, U.S. Pat. No. 5,318,344 "Detachable Bike Seat Jacket" to Wang discloses an inflatable device which conforms only to the typical bicycle seat and includes a skirt and elastic attachment system which could not be scaled up for use with a larger motorcycle seat in any appropriate way. Moreover, it is unclear whether the Wang seat jacket is configured to be filled with air as opposed to liquids, since only fluids are disclosed in general and water/water-cork fluids in particular. Also, due to the placement of the inflation bulb in the Wang configuration, it is apparent that inflation of the seat would be awkward if not impossible while riding.

SUMMARY OF THE INVENTION

The present invention provides an inflatable/deflatable cushion system adapted for installation onto the seat of a gas-powered vehicle, in particular, a motorcycle, though the invention is also applicable to other vehicles, including snowmobiles, all-terrain vehicles, jet skis, etc., including a cushion having an air port for inflation and deflation, means to attach the cushion to the upper surface of a motorcycle seat, and means to inflate and deflate the cushion during use.

The means to attach the cushion preferably provides a permanent attachment as many state laws require that a motorcycle be permanently affixed.

The inflation/deflation means may be either manually or electrically operated. In the latter case, an electrically operated air compressor is supported on the motorcycle and connected in a pneumatic path to the air port on the cushion. An electrical switch in electrical communication with a source of electrical power on the vehicle is provided having a first position activating the air compressor, causing the cushion to inflate, and a second position allowing or actively causing the cushion to deflate. In the preferred embodiment the cushion is generally U-shaped and attached to the motorcycle seat such that the rounded section of the U is most rearward on the seat with the ends of the U pointing forwardly. Configurations are disclosed for both the upper and lower (driver and passenger) levels of seats providing such seating.

The system may be used either with factory-installed or later-added air compressors in the automatically operated version of the invention. In the event the air compressor is later installed, the switch will be in electrical communication with the air compressor, with the first position activating the air compressor and causing the cushion to inflate, and the second position of the switch preferably activating the compressor in the opposite manner, thereby causing the cushion to deflate.

With the air compressor factory installed on the motorcycle, the system will preferably further include an electrically operated pneumatic valve wherein the first position of the switch enables air to flow from the compressor through the valve to inflate the cushion, the second position of the switch enabling air to be expelled from the cushion, thus deflating it.

DETAILED DESCRIPTION OF THE PREFERRED EMBODIMENTS

Before discussing the pneumatic and electrical subsystems comprising the invention, reference will first be made to FIG. 1, which shows a cushion according to the invention and installed on a touring-type motorcycle, in this case a Gold Wing manufactured by Honda. Although the invention is suitable for installation with respect to other saddle styles, in the preferred embodiment those bikes having so-called king/queen type seats are most appropriate owing to the U-shaped preferred construction of the cushion, as is best seen in subsequent figures. In addition to Honda, Harley-Davidson and other manufacturers produce such touring bikes having these larger saddles. Additionally, although the preferred seat configuration is shown primarily with respect to a user's buttocks, other configurations are equally possible, including cushions having back portions, either integral or separate which extend upwardly from the rear portion of the bottom cushion, for example, to provide for lumbar support in such applications.

Figure 1:
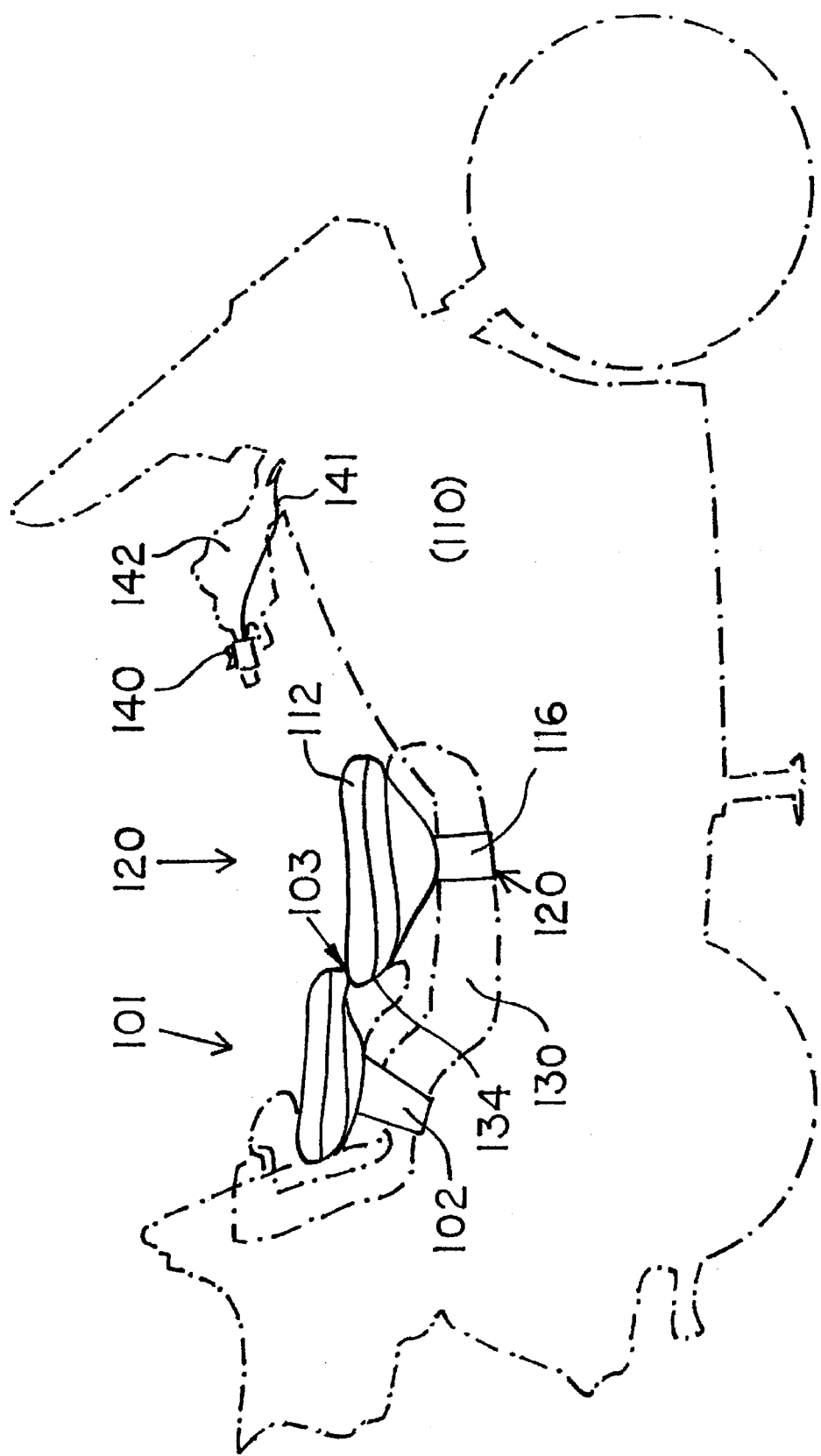
FIG. 1 is a side view drawing of a cushion constructed according to the invention and installed on a touring bike.

With specific reference to FIG. 1, a cushion system according to the invention is shown generally at 100, installed on a seat 130 of the motorcycle 110. The inflatable/deflatable cushion 100 includes an air-tight portion 112 created by bonding pieces of a sturdy, flexible material such as vinyl, polyurethane, or the like to create a bladder which may be air-filled. In an alternative construction, multiple layers may be used to construct the inflatable portion 112, for instance, if a more attractive or decorative outer shell is to be used over an inner air-tight bladder.

Preferably, on either side of the cushion are straps 116 which are pulled down and fastened in an area beneath the seat, using wider portions 114, which assist in stabilizing the structure onto the seat. Different fastening mechanisms may be used, including snaps or rivets formed on the free ends of the straps 116 on either side. Alternatively, these free ends may have grommets included for use with lacing or springs to keep the cushion fastened in a stable manner and properly oriented. The various fastening mechanisms are more clearly seen with reference to FIGS. 2 and 3, which show the seat removed from the saddle.

Thus, although the cushion may be attached with simple clips in the vicinity of 120, in the preferred embodiment the actual attachment takes place underneath the seat, forcing the consumer or manufacturer to actually remove the seat, install the cushion, and reattach the seat to the vehicle. Since the user is forced to unfasten the underlying straps, such a configuration should be considered "permanent" and in compliance with those ordinances requiring permanent affixation with regard to motorcycle seat add-ons. For an even more permanent attachment, the free ends of the straps may be bonded to one another beneath the seat using glue, for example, or, alternatively, an entire seat may be made available, either during factory installation or as an aftermarket product, wherein one or more inflatable bladders are permanently disposed beneath the outer covering the seat.

Advantageously, such king/queen seats of the type depicted typically also include a rear hump portion 134 whereby the back of the cushion 112 may rest against in the vicinity of 134 such that only the two straps 116 and this rearward pressure fit are required to stabilize the cushion onto the seat. In addition to a cushion for the rider depicted generally at 100, an additionally seat cushion according to the invention, depicted at 101, may similarly be provided for the upper level of the seat utilizing the same principles involved herein, including a strap 102 and the fastening mechanisms described above, though, with an additional cushion 101 separate controls will preferably be provided to suit the individual comfort of the driver and passenger. That is, while the inflate/deflate controls for the driver are preferably provided on the handlebars, and although the inflate/deflate controls for the passenger may likewise be provided on the handlebars as well, in the preferred embodiment a separate set of controls will be provided for the passenger in a more accessible area, for example, by way of a set of buttons on the side or rear portion of the seat. As an alternative to two separate driver/passenger cushions 101 and 102, respectively, a single cushion, joined in the vicinity of 103, may also be provided according to the invention, which would then take on an S-shape and would preferably include forward and rearward straps to ensure proper orientation and, ideally, permanent affixation.

As mentioned, a control 140 is provided on the handlebars 142 of the motorcycle, at least for the operator of the vehicle.

As will shortly be described in greater detail, these controls 140 preferably take the form of a rocker switch mounted near to the hand grip of the right or left side of the handle bars, electrical wiring 141 being somehow preferably secured to the bar to prevent interference. Of course, alternatively, multiple switches may be provided, for example, a single-pole switch for inflation and another such switch for deflation, in which case the two controls may be mounted adjacently or separately on the right and left handlebars, respectively. Additionally, in the event that the seat is to be deflated manually, an electrical switch only for inflation may alternatively be provided.

Figure 2:
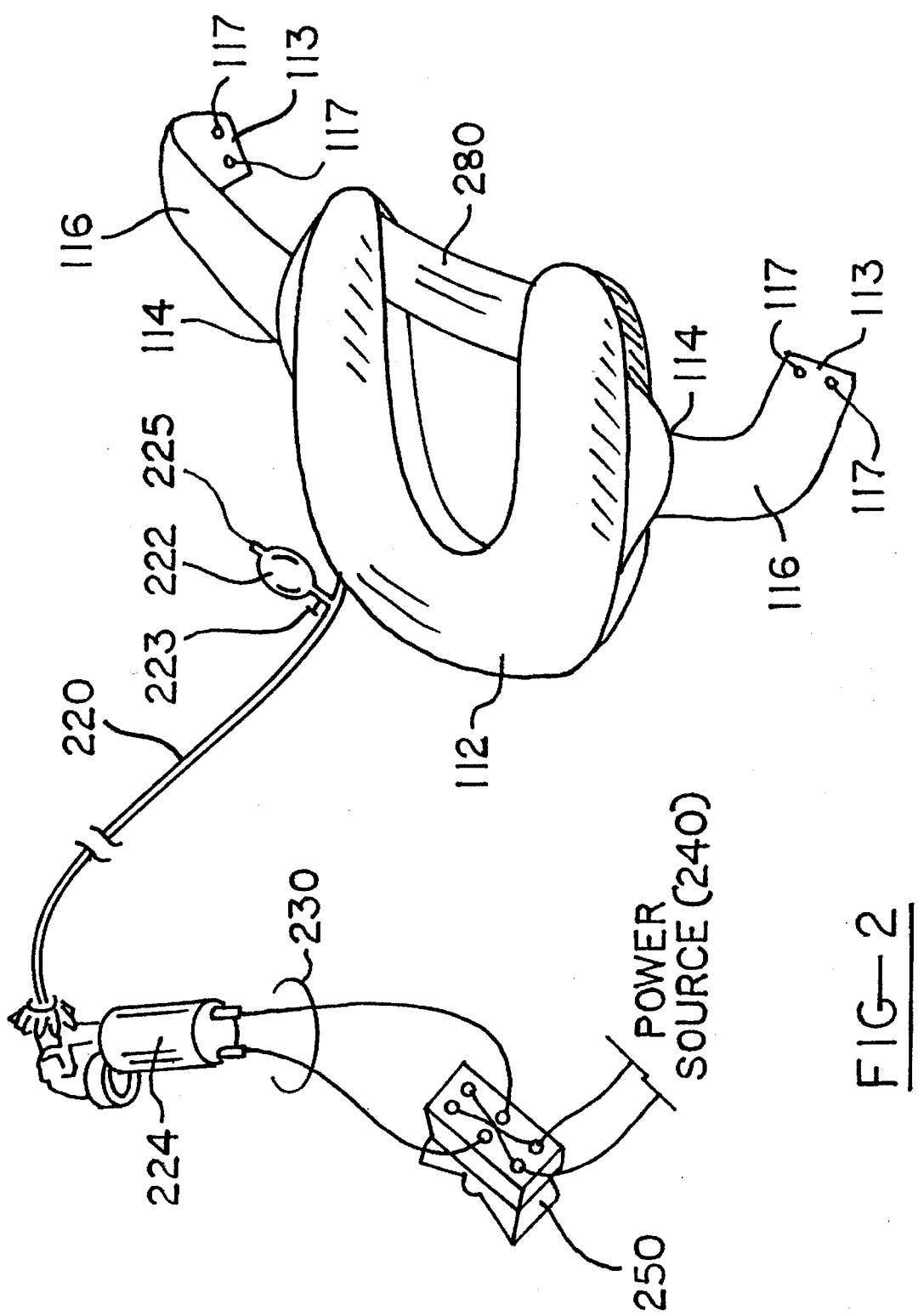
FIG. 2 is a combined oblique drawing and schematic which illustrates one embodiment of the invention utilizing an add-on air compressor.
Figure 3:
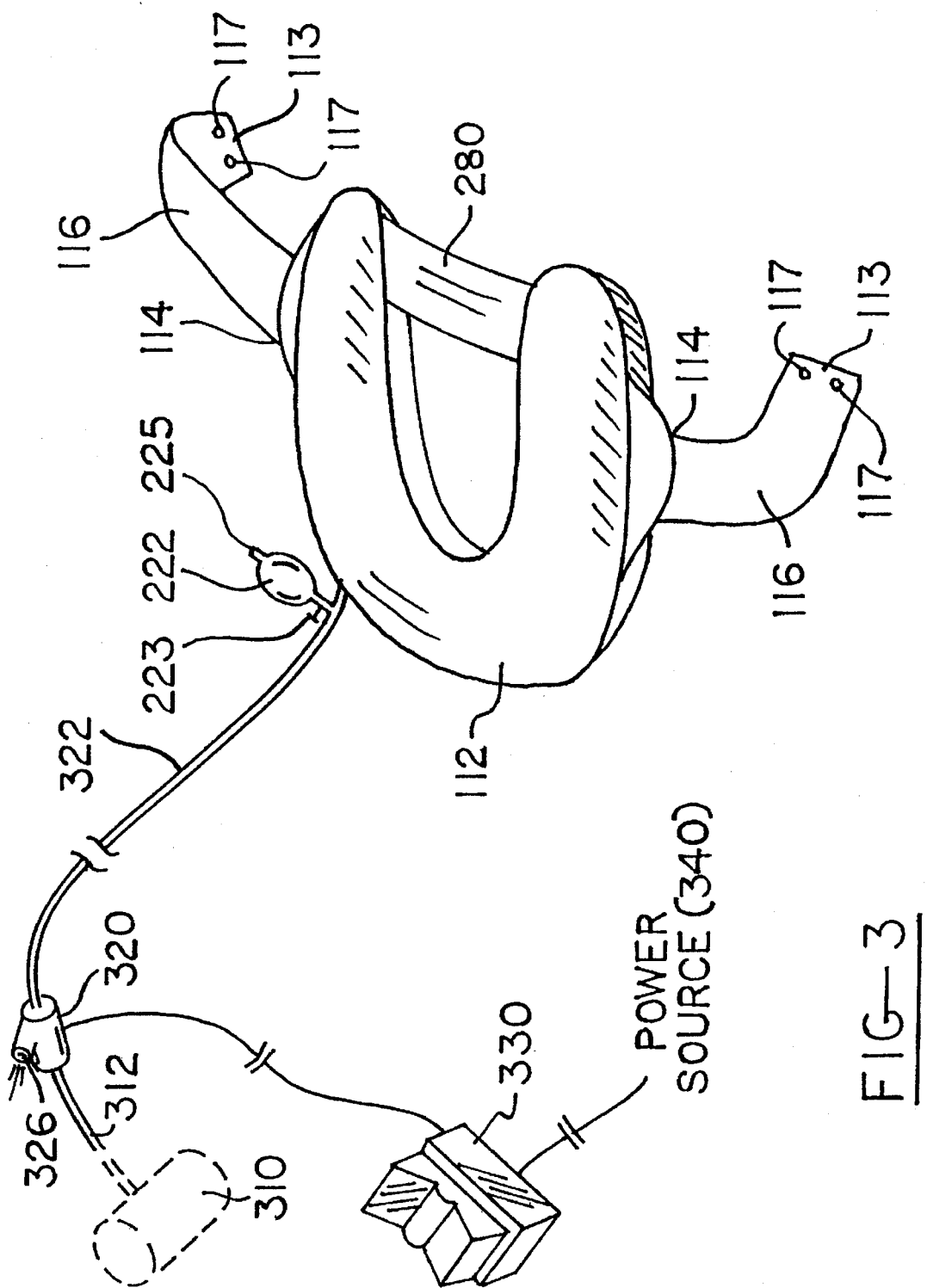
FIG. 3 is an alternative representation of the invention making use of a factory-installed air compressor and a pneumatic switch for inflation and deflation of the cushion.
Figure 4:
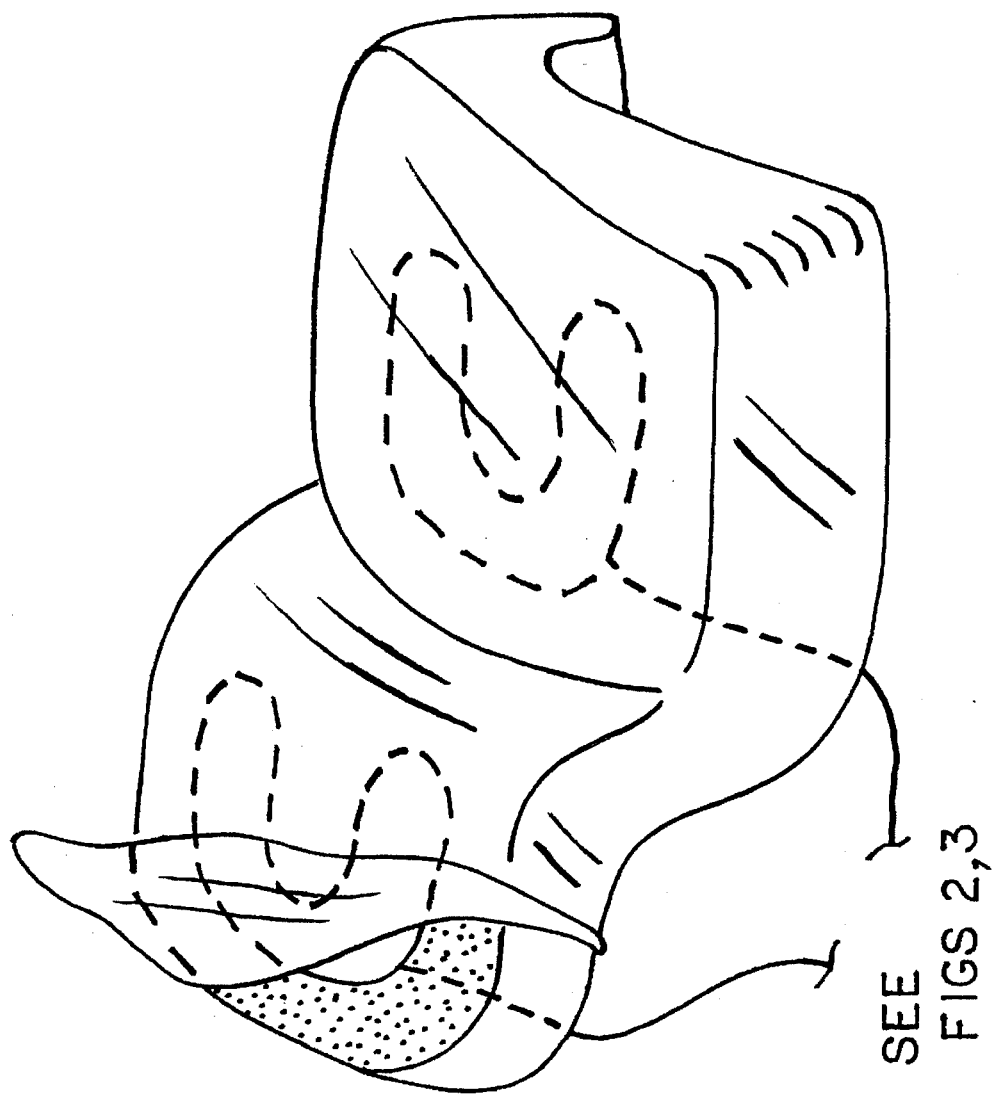
FIG. 4 is an oblique drawing which illustrates two bladders installed beneath upholstery on a seat having upper and lower levels.

FIG. 2 is an oblique representation of the cushion portion 112 also showing, in schematic form, preferred electrical and pneumatic connections. Associated components are shown detached from the motorcycle for illustrative purposes, but preferably would be supported somewhere on the motorcycle or hidden therein, such as under the seat in a storage chamber or within the framework of the bike, depending upon the style of the vehicle. FIGS. 2 and 3 also show the free ends 113 of the straps 116, with fasteners 117 which, as mentioned, may take various forms in the alternative, including snaps or various types, or more permanent riveted connections or, alternatively, springs may be installed between opposing sets of fasteners in the form of grommets or lacing may be used. As further alternatives, hook-and-loop patches may be used on opposing ends of the straps 116 or the ends may be even more permanently connected using glue, plastic weldment, and so forth.

Attaching to the cushion 112 is an air hose 220, preferably making connection rearwardly of the cushion 112. Hand-operated bulb 222 may optionally be provided for inflation or deflation through port 225 using T-valve 223, particularly in an emergency situation or if the pneumatic system fails for one reason or another. In the embodiment of FIG. 2, this pneumatic system includes an air compressor 224 which may be purchased from Interdynamics of Brooklyn, N.Y., though other suitable units are available from other manufacturers. Preferably, the air compressor includes a reversible DC motor, thereby enabling compressed air to be delivered to the cushion 112 through hose 220 or extracted from the cushion through the same hose by reversing the rotation of the electrical motor in the compressor 224.

Power to the compressor is delivered over wires 230 which are in further electrical communication with a source of power 240, typically to the fuse panel of the bike which power is supplied through the vehicle's alternator. Alternatively, other electrical connections may be made, including direct connection to the vehicle battery. Preferably, electrical switch 250 is of the reversible type, using, for example, a double-pole, double-throw configuration connected in criss-cross fashion whereby the rocker action of the switch reverses the polarity of power delivered to the compressor unit 224. The oblique drawing of FIG. 2 also shows the preferred use of web 280, which keeps the U-shaped sections of the pad from spreading apart when properly installed.

Now making reference to FIG. 3, there is shown an alternative embodiment of the invention, wherein, in contrast to the configuration of FIG. 2, an existing, factory-installed compressor, depicted with broken lines 310, is used in lieu of an add-on unit. Top-of-the-line bikes typically include such factory-installed compressors for use with pneumatic suspension systems. As part of the installation of the inventive cushion, pneumatic line 312 is severed and a pneumatic valve 320 is installed which is operative to route compressed air either to the cushion over line 322 or expel air therefrom through tube 326. The two-way action of this valve 320 is controlled by a switch 330 connected to source of power 340. As in the case of FIG. 2, this switch 320 preferably provides two positions, thus enabling the switch 320 to perform both inflation and deflation capabilities from a single, convenient point of control. Such pneumatic switches are commercially available. For example, Norgren Inc. of Denver, Colo. offers a three/two (port/position) pneumatic valve, Model No. MH12BDA-24-BLEA, which could be used for this purpose, though alternatives are no doubt also commercially available.

Having thus described my invention, I claim:

1. An inflatable/deflatable cushion for a motorcycle seat having a rear portion and an upper surface with a perimeter, comprising:

a single, generally U-shaped bladder having an air port for inflation and deflation thereof, wherein, with the bladder properly positioned, the two ends of the U are oriented forwardly and the rounded section of the U is oriented rearwardly and shaped for conformal agreement with the rear portion of the motorcycle seat for a single rider thereon;

means to permanently hold the bladder against the upper surface of the motorcycle seat; and means to inflate and deflate the bladder once positioned.

2. The inflatable/deflatable cushion of claim 1, wherein the bladder is disposed beneath a layer of upholstery material covering the bladder.

3. The inflatable/deflatable cushion of claim 1, wherein the means to permanently hold the bladder against the upper surface of the motorcycle seat includes a pair of opposing straps which attach to one another underneath the seat, rendering such attachment inaccessible with the seat in place for use.

4. An inflatable/deflatable cushion system for a motorcycle having a saddle with lower and upper levels to accommodate a driver and a passenger, respectively, each level having an upper surface with a specifically shaped perimeter, the system comprising:

two shaped bladders, each having its own air port for inflation and deflation thereof, the shape of each bladder being adapted to conform to at least a portion of the perimeter of the respective level upon which it is installed;

independent means for holding each bladder in place on its respective level; and independent means to inflate and deflate each bladder.

5. An inflatable/deflatable cushion system adapted for installation onto a motorcycle having a source of electrical power and a seat having an upper surface with a perimeter, comprising:

a shaped bladder having an air port for inflation and deflation thereof, the outer shape of the bladder being adapted to conform to at least a portion of the perimeter of the seat;

means to attach the bladder to the upper surface of the seat;

an electrically operated air compressor with means for mounting the compressor to the motorcycle, the compressor including an air output connected in a pneumatic path to the air port on the bladder; and an electrical switch adapted for electrical connection to the source of electrical power, the switch having a first position activating the air compressor and causing the bladder to inflate, and a second position causing the bladder to deflate.

6. The cushion system of claim 5 wherein the air compressor may be operated alternatively in a pressurization and suction mode at its output, the second position of the switch causing the compressor to operate in suction mode so as to deflate the cushion.

7. The cushion system of claim 5 further including an electrically operated pneumatic valve, and wherein the first position of the switch causes air to flow from the compressor to inflate the cushion, and the second position enables air to be expelled from the cushion, thereby deflating it.

8. The cushion system of claim 5 further including a manually operated valve for deflating the cushion.

9. The cushion system of claim 5 further including manually operated means for inflating the cushion.

10. The cushion system of claim 9, the manually operated means for inflating the cushion including a bulb-type hand pump connected in a pneumatic path with the air port.

* * * * *